United States Patent
Hodges (10) Patent No.: US 11,365,706 B2
(45) Date of Patent: Jun. 21, 2022

(54) TURBINE ENGINE SYSTEM UTILIZING AN AUGMENTED COMBUSTION MODULE

(71) Applicant: William Todd Hodges, Yorktown, VA (US)

(72) Inventor: William Todd Hodges, Yorktown, VA (US)

(*) Notice: Subject to any disclaimer, the term of this patent is extended or adjusted under 35 U.S.C. 154(b) by 0 days.

(21) Appl. No.: 17/128,080

(22) Filed: Dec. 19, 2020

(65) Prior Publication Data

US 2022/0136460 A1  May 5, 2022

Related U.S. Application Data

(60) Provisional application No. 63/109,596, filed on Nov. 4, 2020.

(51) Int. Cl.
*F02C 3/107* (2006.01)
*F02C 5/06* (2006.01)
(Continued)

(52) U.S. Cl.
CPC .............. *F02K 5/02* (2013.01); *F02C 3/107* (2013.01); *F02C 5/06* (2013.01);
(Continued)

(58) Field of Classification Search
CPC ........ B64D 2027/026; B64D 27/04–08; B64D 27/10–20; F02C 5/06–08; F02C 7/32;
(Continued)

(56) References Cited

U.S. PATENT DOCUMENTS 2,580,591 A    1/1952 Pouit
3,199,292 A    6/1965 Berger et al.
(Continued)

OTHER PUBLICATIONS

AIEUK, Wankel Rotary Engines—I understand rotary engines can only run on gasoline?, Mar. 15, 2018, Advanced Innovative Engineering, https://www.aieuk.com/blog/wankel-rotary-engines-i-understand-rotary-engines-can-only-run-on-gasoline/ (Year: 2018).*
(Continued)

*Primary Examiner* — Stephanie Sebasco Cheng
(74) *Attorney, Agent, or Firm* — Invention To Patent Services; Alex Hobson (57) ABSTRACT

A turbine engine system utilizes one or more augmented combustion modules to produce an exhaust that is fed into the turbine portion of the engine and wherein power is produced by the augmented combustion module for use to drive the main shaft and/or for auxiliary purposes. An augmented combustion module is configured between the compressor and the turbine of the engine and receives compressed air from the compressor and ignites an air/fuel-mixture to turn a shaft that can be used to produce power. The shaft may be coupled with an electrical power generator, a pump, a hydraulic or pneumatic power generator and/or power conversion or transmission devices and/or coupled with the main shaft of the turbine engine. The power from a power generator may be stored in a battery, hydraulic accumulator or pneumatic accumulator and may be used to power auxiliary electrical, hydraulic or pneumatic devices.

18 Claims, 12 Drawing Sheets

(51) Int. Cl.
  *B64D 27/02* (2006.01)
  *F02K 5/02* (2006.01)
(52) U.S. Cl.
  CPC .. *B64D 2027/026* (2013.01); *F05D 2220/323* (2013.01); *F05D 2240/35* (2013.01)
(58) Field of Classification Search
  CPC .......... F02C 6/10–12; F02C 3/107–113; F02C 5/00–06; F02K 5/00–026; F02K 3/06; F02B 41/10; F02B 2041/12; F02B 61/04; F02B 53/14
  USPC ...................................................... 244/53 R
  See application file for complete search history.

(56) References Cited

U.S. PATENT DOCUMENTS

| | | | | |
|---|---|---|---|---|
| 4,072,131 | A * | 2/1978 | Pentel | F02B 53/12 |
| | | | | 123/242 |
| 7,628,018 | B2 | 12/2009 | Mowill | |
| 7,753,036 | B2 | 7/2010 | Lents et al. | |
| 7,775,044 | B2 * | 8/2010 | Julien | F02C 3/055 |
| | | | | 60/624 |
| 7,966,833 | B2 | 6/2011 | Beutin et al. | |
| 8,522,522 | B2 | 9/2013 | Poisson | |
| 8,943,839 | B2 | 2/2015 | Merry et al. | |
| 9,027,345 | B2 * | 5/2015 | Julien | F01C 11/006 |
| | | | | 60/614 |
| 9,032,702 | B2 | 5/2015 | Beier | |
| 9,512,721 | B2 | 12/2016 | Thomassin | |
| 9,677,534 | B2 * | 6/2017 | Ikeda | H05H 1/52 |
| 9,994,332 | B2 * | 6/2018 | Ullyott | F01C 11/008 |
| 10,107,195 | B2 | 10/2018 | Boldue et al. | |
| 10,119,460 | B2 * | 11/2018 | Primus | F02C 6/20 |
| 10,145,291 | B1 * | 12/2018 | Thomassin | F02B 19/1023 |
| 10,450,952 | B2 * | 10/2019 | Julien | F02K 3/06 |
| 10,501,200 | B2 | 12/2019 | Ullyott et al. | |
| 10,570,816 | B2 * | 2/2020 | Thomassin | F02B 37/005 |
| 10,605,111 | B2 | 3/2020 | Bywater | |
| 10,590,842 | B2 | 5/2020 | Ullyott et al. | |
| 10,648,368 | B2 * | 5/2020 | Slayter | F02C 7/277 |
| 11,149,578 | B2 * | 10/2021 | Joshi | F02C 7/32 |
| 2010/0219779 | A1 * | 9/2010 | Bradbrook | F02C 7/32 |
| | | | | 60/773 |
| 2011/0116783 | A1 | 5/2011 | Liu et al. | |
| 2012/0198814 | A1 | 8/2012 | Menashe | |
| 2015/0260127 | A1 * | 9/2015 | Wennerstrom | F02K 3/115 |
| | | | | 60/226.1 |
| 2016/0047319 | A1 | 2/2016 | Gieras et al. | |
| 2016/0333793 | A1 | 11/2016 | Viel et al. | |
| 2017/0335795 | A1 * | 11/2017 | Klemen | F02C 7/06 |
| 2018/0285497 | A1 * | 10/2018 | Goodwin | G06F 30/15 |

OTHER PUBLICATIONS

April Covington, The Investigation of Combustion and Emissions of Jp8 Fuel in an Auxiliary Power Unit, 2011, Georgia Souther University, Electronic Theses and Dissertations, 774, https://digitalcommons.georgiasouthern.edu/etd/774 (Year: 2011).*

Kestutis C. Civinskas and Gerald A. Kraft, Preliminary Evaluation of a Turbine/Rotary Combustion Compound Engine for a Subsonic Transport, Mar. 1976, NASA TM X-71906 (Year: 1976).*

* cited by examiner

TURBINE ENGINE SYSTEM UTILIZING AN AUGMENTED COMBUSTION MODULE

CROSS REFERENCE TO RELATED APPLICATIONS

This application claims the benefit of priority to U.S. provisional patent application No. 63,109,596, filed on Nov. 4, 2020; the entirety of which is hereby incorporated by reference herein.

BACKGROUND OF THE INVENTION

Field of the Invention

The invention relates to turbine engine systems that utilize augmented combustion modules to produce an exhaust, which is a high enthalpy gas flow, that is fed into the turbine portion of the engine and wherein power is produced by the augmented combustion module for use to drive the main shaft and/or for auxiliary purposes.

Background

Current turbine engines compress air, and then inject fuel into the compressed air and ignite that air-fuel mixture in a centralized system to produce an exhaust of this combusted fuel onto the turbine blades. This requires a very large flow of air to keep both the combustion system and turbine cool enough to prevent damage. The brake specific fuel and brake specific air consumptions are very high as a result. Brake specific fuel consumption (BSFC) is a measure of how many pounds of fuel is required to make 1 hp for 1 hour (lb/hp-hr). Brake specific air consumption (BSAC) is a measure of how many pounds of air it takes to make 1 hp for 1 hour (lb/hp-hr). Furthermore, standard turbine engines require excess airflow for cooling purposes.

SUMMARY OF THE INVENTION

The invention is directed to turbine engine systems that utilize one or more augmented combustion modules to produce an exhaust that is fed into the turbine portion of the engine and wherein power is produced by the augmented combustion module for use to drive the main shaft and/or for auxiliary purposes. A turbine engine may have one or more augmented combustion modules configured between the compressor and the turbine of the engine. An exemplary augmented combustion module receives compressed air from the compressor, further compresses said air, injects fuel and ignites an air/fuel mixture, expanding said mixture, to turn a shaft that can be used to produce power. The shaft may be coupled with a power generator such as an electrical generator, hydraulic pump, pneumatic pump and/or any other power conversion device. The shaft may be coupled with the main shaft of the turbine to provide torque to the main shaft. The augmented combustion module may provide proportional control of power to the turbine engine system. Some of the power may be used to drive the main shaft and some may be used to power other components of the turbine engine system.

The shaft of an augmented combustion module may be coupled with the main shaft through physical linkages or gears that can be engaged or disengaged, or electrical power produced by an electrical generator, driven by the shaft, may be used to provide thrust via a motor coupled with the main shaft. A combination of power output from the augmented combustion module may be realized, wherein some power is used to drive the main shaft and some is used to produce electrical, hydraulic and/or pneumatic power. The power from a power generator may be stored in a battery, hydraulic accumulator or pneumatic accumulator and may be used to power auxiliary electrical, hydraulic or pneumatic devices, such as devices on a vehicle, such as an aircraft, watercraft or land vehicle. For example, an augmented combustion module may be coupled with an electrical generator that produces power that is stored in a battery and the battery may power Aerodynamic Flow Control Devices and/or other electrical components on an aircraft. An augmented combustion module may compress a pneumatic fluid, or pressurize a hydraulic fluid vessel, or act as a pump for a hydraulic fluid to provide power to auxiliary devices on the vehicle.

An exemplary augmented combustion module is a rotary or reciprocating engine that combusts a fuel to propel a shaft and produces an exhaust. An exemplary augmented combustion module receives compressed air from the compressor, further compresses said air, injects fuel and ignites an air/fuel mixture, expanding said mixture, to turn a shaft that can be used to produce power. An exemplary augmented combustion module may receive compressed air that receives fuel injection for combustion. As detailed herein, the shaft may be coupled with a power generator and the exhaust or at least a portion of the exhaust may be directed to a turbine to drive the turbine. An augmented combustion module receives the compressed air from the compressor of the turbine engine system and mixes this compressed air with fuel that is then further compressed and combusted to drive the shaft. The combusted air and fuel, or a portion thereof may be directed to a turbine. The turbine may be coupled with the main shaft to turn the main shaft. The main shaft may be coupled with the compressor to compress the air. In an exemplary embodiment, a plurality of augmented combustion modules are coupled with a single or multiple power generator(s). The output shafts of the augmented combustion module may be coupled to a common power generator physically or electrically. The shafts of the augmented combustion module may be coupled through a transmission comprising gears and linkages, for example. Any suitable rotary type engine that combusts fuel to rotate a shaft may be used as an augmented combustion module herein.

An exemplary augmented combustion module is a rotary or reciprocating engine and may comprise a cooling system to prevent overheating and wear. A cooling system may be a liquid cooling system that is a closed loop wherein the fluid is passed across or through cooling channels of the augmented combustion module to absorb heat and then passes to a heat exchanger to liberate heat. A cooling system may employ vanes and/or fins to increase surface area for heat exchange.

An exemplary turbine engine system may be used in a vehicle and/or power generation applications. In an exemplary embodiment, the turbine engine is utilized on a vehicle, such as an aircraft, watercraft, or land vehicle. A vehicle, as used herein, is a powered moving device configured to transport people or cargo. A power generator may be coupled with the augmented combustion module or modules and may produce power that is utilized by components of the vehicle. A turbine engine system may be part of a power producing system to generate power for homes, commercial buildings, institutions, and governmental buildings, such as an electrical power plant.

An exemplary turbine engine system includes a turbine engine that has an air inlet, a compressor to compress the air, a fuel injector to combine fuel and air in an air/fuel mixture that has an air/fuel concentration ratio. A turbine engine may have one or more compressors. Air entering the turbine engine may be initially compressed by a low pressure compressor and subsequently by a high pressure compressor. As described herein, this air/fuel ratio may be much closer to stoichiometric ratios than conventional turbine engines that run at much higher air/fuel ratios. The air/fuel mixture is ignited in the one or more augmented combustion modules to produce an exhaust that is fed to the turbine to propel the turbine blades. The brake specific fuel consumption and brake specific air consumption may be significantly reduced using a turbine engine system having one or more augmented combustion modules.

An exemplary turbine engine system may have a single main shaft that is propelled at least in part by the turbine blades or may be a multi-spool jet having two or more shafts and turbine blade assemblies, such as a dual spool engine. The one or more main shafts of a turbine typically run centrally through the turbine engine and are driven by the turbine blades attached thereto. A motor may be coupled with the main shaft to also propel the main shaft and this motor may be used initially to get the turbine operating and then may disengage or reduce power as the turbine is propelled by the turbine blades. As detailed herein, the augmented combustion module may be coupled with a main shaft to propel the main shaft. A power generator may extend between the augmented combustion module and the main shaft and this power generator, such as a gear transmission may be configured to engage and disengage with the main shaft, or the augmented combustion module. In an exemplary embodiment, the augmented combustion module is coupled with an electrical power generator and the electrical power is used to propel the main shaft, such as through said motor.

An exemplary turbine engine may also include a fan having fan blades to provide thrust from the turbine system. The fan and fan blades may be configured proximal to the intake or inlet of the turbine or on the outlet end of the turbine system. The fan blades may be coupled with the main shaft and/or may be driven by a motor. Again, this motor may receive power produced by a power generator coupled with the augmented combustion module(s). The power generator may be coupled with a battery and the battery power may be used to drive the motor to propel the fan.

The exemplary turbine engine system comprises one or more augmented combustion module(s). In an exemplary embodiment the turbine engine system comprises a plurality of augmented combustion modules configured in an array around the main shaft of the turbine, such as two or more, three or more, six or more, ten or more and any range between and including the number of augmented combustion modules listed. The augmented combustion modules may be arranged at offset angles from each other circumferentially about the main shaft, such as about 20 degree intervals or more, about 30 degree intervals or more, about 45 degree intervals or more, about 60 degree intervals or more and about 90 degree intervals or more. Also, the circumferential array may configure the augmented combustion modules with substantially equal offset angles from each other, wherein a four augmented combustion module array has each augmented combustion module offset from the two adjacent augmented combustion modules by an offset angle of about 90 degrees, plus or minus 10 degrees. Substantially equal offset angles means within 10 degrees of an equal offset angle for the number of augmented combustion modules configured circumferentially; wherein an equal offset angle is 360 degrees divided by the number of augmented combustion modules.

An exemplary augmented combustion module is a rotary engine having an intake chamber, a compression chamber, an ignitor in a combustion chamber and an exhaust chamber coupled with an outlet. An exemplary augmented combustion module or rotary engine includes various types, including a piston engine, or any other type of engine that combusts a fuel to turn a shaft. An exemplary augmented combustion module or rotary engine is a Wankel engine. The outlet of the augmented combustion module is configured to expel the exhaust into the turbine portion of the turbine engine and propel the turbine blades and thereby drive the main shaft. A Wankel engine has an eccentric shaft couple to a rotor, wherein the chambers are dynamic chambers, formed by the rotation of the rotor within a housing. An exemplary augmented combustion module may be a two-stroke or four-stroke engine.

An exemplary augmented combustion module may utilize a fuel such as gasoline, diesel fuel, hydrogen, alcohol, methane or natural gas and the like. A fuel may be gaseous fuel, in gas form, or liquid fuel, in liquid form. A gaseous fuel may include hydrogen, methane and the like. The air/fuel mixture may have an air/fuel concentration ratio that is substantially the stoichiometric mixture ratio, or within ±20% of the stoichiometric mixture ratio provided herein for a given fuel type. For gasoline the stoichiometric mixture ratio is 15:1. For diesel fuel, the stoichiometric mixture ratio is 14.5:1. For hydrogen, the stoichiometric mixture ratio is 34.5:1. For methane fuel, including natural gas, the stoichiometric mixture ratio is 10.4:1. For methanol, the stoichiometric mixture ratio is 6.4:1. For ethanol, the stoichiometric mixture ratio is 8.95:1. For JP type kerosene turbine fuels, the stoichiometric mixture ratio is 14.5:1.

A fuel injector may be located in the combustion or intake chamber of the augmented combustion module. An exemplary fuel injector may inject liquid or gaseous fuel and may be a plasma-jet-fuel-injector.

An exemplary augmented combustion module may comprise an induction air intercooler, having an air intake heat exchanger to maintain the augmented combustion module below a temperature limit and increase efficiency.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
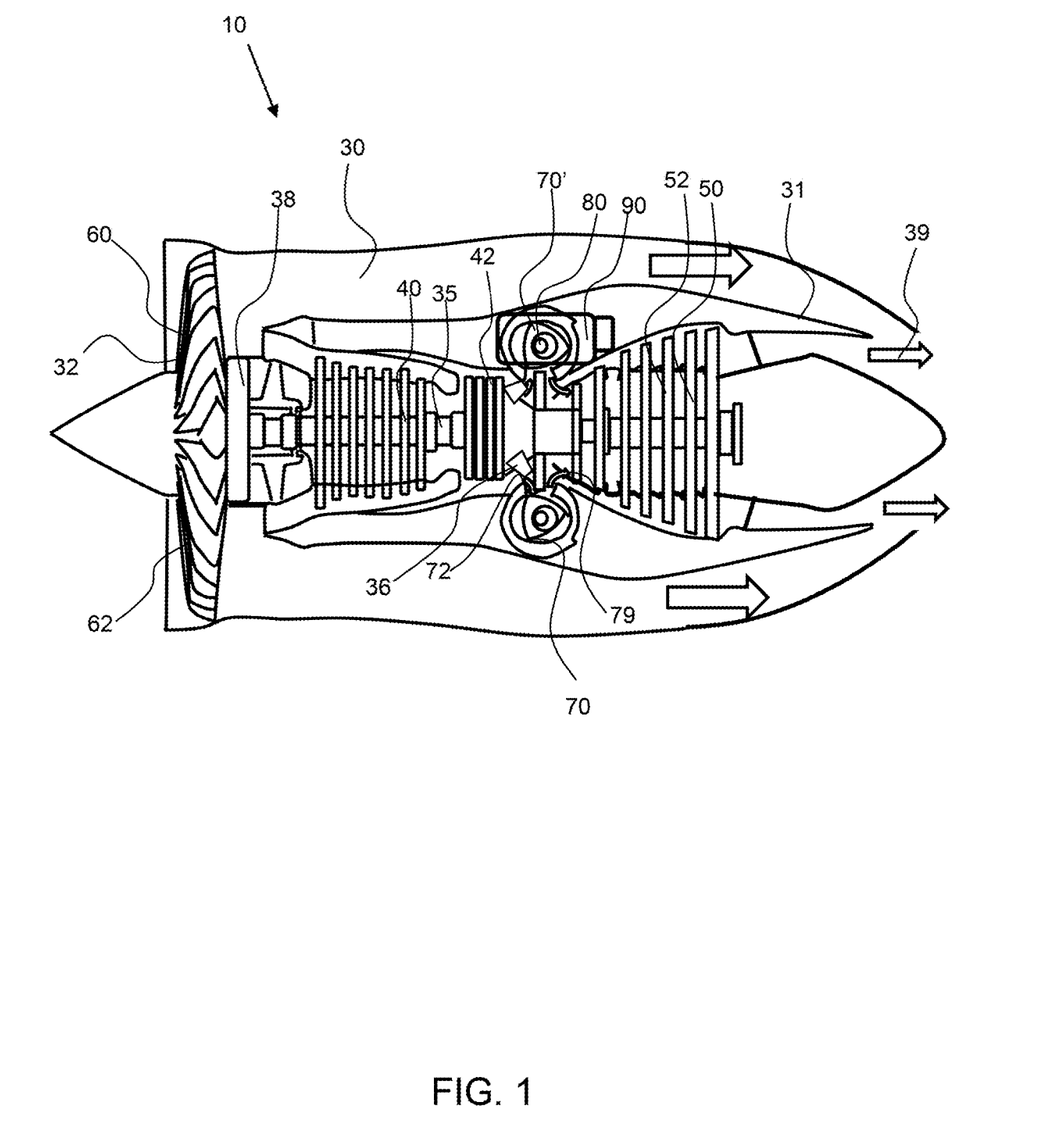
FIG. 1 shows a side cross-sectional view of an exemplary turbine engine system comprising a plurality of augmented combustion modules configured between the compressor and the turbine portions of the turbine engine.

As shown in FIG. 1, an exemplary turbine engine system 10 comprises a plurality of augmented combustion modules 70, 70' configured between the high pressure compressor 42 and the turbine 50 portions of the turbine engine 30. A low pressure compressor 40 may be configured more proximal to the intake 32 than the high pressure compressor. The turbine engine has a fan 60 with fan blades 62 coupled to the main shaft 35 and configured to rotate to draw air into the intake 32 and provide thrust. A motor 38 may drive the fan 60, at least initially, to draw air into the turbine. The air is compressed by the compressors and then enters into the inlet 72 of the augmented combustion module 70, where the compressed air and fuel is further compressed and then combusted to drive a shaft of the augmented combustion module to produce power, such as electrical power, hydraulic power or pneumatic power. The combusted air and fuel exhaust through the outlet 79 of the augmented combustion module and enter into the turbine 50, where additional power is produced by the turbine blades 52 driving a main shaft. The combusted air and fuel then exit the turbine engine through an outlet 39 in the turbine housing 31. The shaft 80 of the augmented combustion module may be coupled with a power generator 90 to produce power. A compressor may include a low-pressure compressor 40 and a high-pressure compressor 42. An intercooler 36 may be configured to reduce air temperature entering the augmented combustion module, to improve efficiency of the augmented combustion module and the turbine engine system 10.

Figure 2:
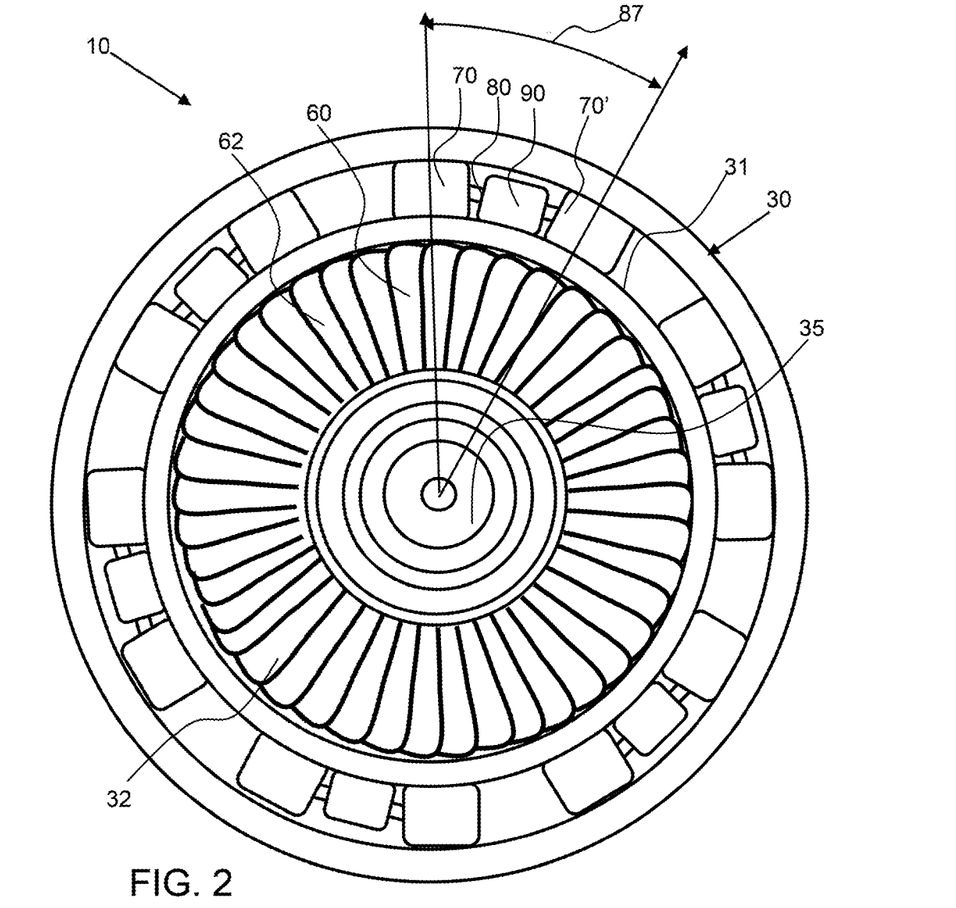
FIG. 2 shows a front view of an exemplary turbine engine system comprising a plurality of augmented combustion modules configured in an array circumferentially around the turbine engine.

As shown in FIG. 2, an exemplary turbine engine system 10 comprises a plurality of augmented combustion modules 70, 70' arrayed about the main shaft 35, or configured in a circumferential array around the turbine engine 30. There are six pairs of augmented combustion modules, wherein each are coupled with a common power generator 90. The twelve augmented combustion modules are configured about 30 degrees from each other circumferentially about the main shaft. A first augmented combustion module 70 is configured at an offset angle 87 from a second augmented combustion module 70'. The augmented combustion modules are coupled with a power generator 90, by the shaft 80. The fan 60 and fan blades 62 are shown configured about the main shaft 35.

Figure 3:
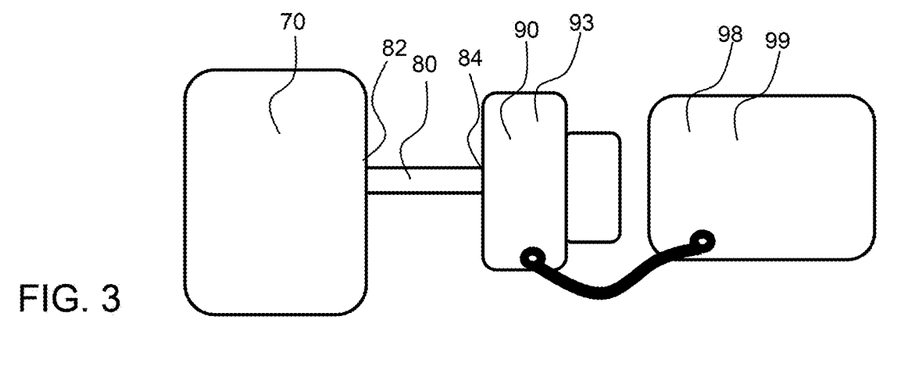
FIG. 3 shows a side view of an exemplary augmented combustion module coupled to a power generator, a generator that is coupled with an auxiliary electrical device, a battery.
Figure 4:
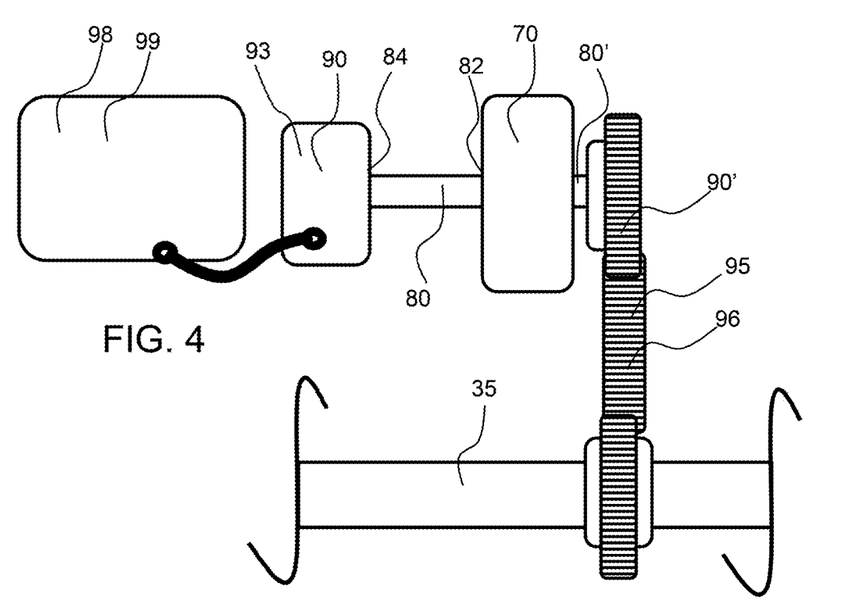
FIG. 4 shows a side view of an exemplary augmented combustion module coupled with a power generator, a power coupler that is coupled with the main shaft to drive the main shaft.
Figure 5:
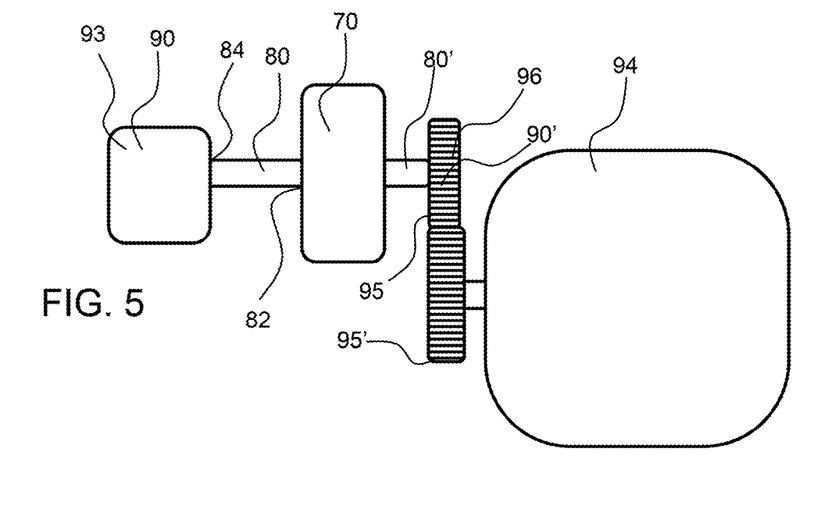
FIG. 5 shows a side view of an exemplary augmented combustion module coupled to a power generator, a compressor, by a power coupler, via a pair of gears.

Referring now to FIGS. 3 to 5, an exemplary augmented combustion module 70 is coupled to a power generator 90 to produce and/or store power from the augmented combustion modules. As shown in FIG. 3, an augmented combustion module 70 is coupled to an electrical generator 93 that produces electrical power. The generator is coupled with an auxiliary electrical device 98, a battery 99, but may be coupled directly with an auxiliary electrical device, such as a device on the vehicle or an electric motor on the main shaft. The shaft 80 of the augmented combustion module is coupled with the power generator 90 to produce power. The shaft 80 has a coupled end 82, coupled with the augmented combustion module, and a power generation end 84 coupled with the power generator 90.

As shown in FIG. 4, an exemplary augmented combustion module 70 is coupled with a power generator 90', a power coupler 96 that produces torque, such as torque to drive a main shaft 35. The power coupler in this embodiment may comprise a transmission employing a gear 95 or a plurality of gears and this power coupler may be engaged and disengaged with the main shaft as required. Also, the augmented combustion module 70 is coupled to a second power generator 90, an electrical power generator 93 that produces electrical power by shaft 80. The electrical generator is coupled with an auxiliary electrical device 98, a battery 99, but may be coupled directly with an auxiliary electrical device, such as a device on the vehicle. The shafts 80, 80' extend from either side of the augmented combustion module and are coupled with two power generators 90, 90' in this embodiment.

As shown in FIG. 5, an exemplary augmented combustion module 70 is coupled to a power generator 90', a compressor 94, by a power coupler 96, a pair of gears 95, 95'. Also, the augmented combustion module 70 is coupled to an electrical power generator 93 that produces electrical power. The shafts 80, 80' extend from either side of the augmented combustion module and are coupled with two power generators 90, 90' in this embodiment.

Figure 6:
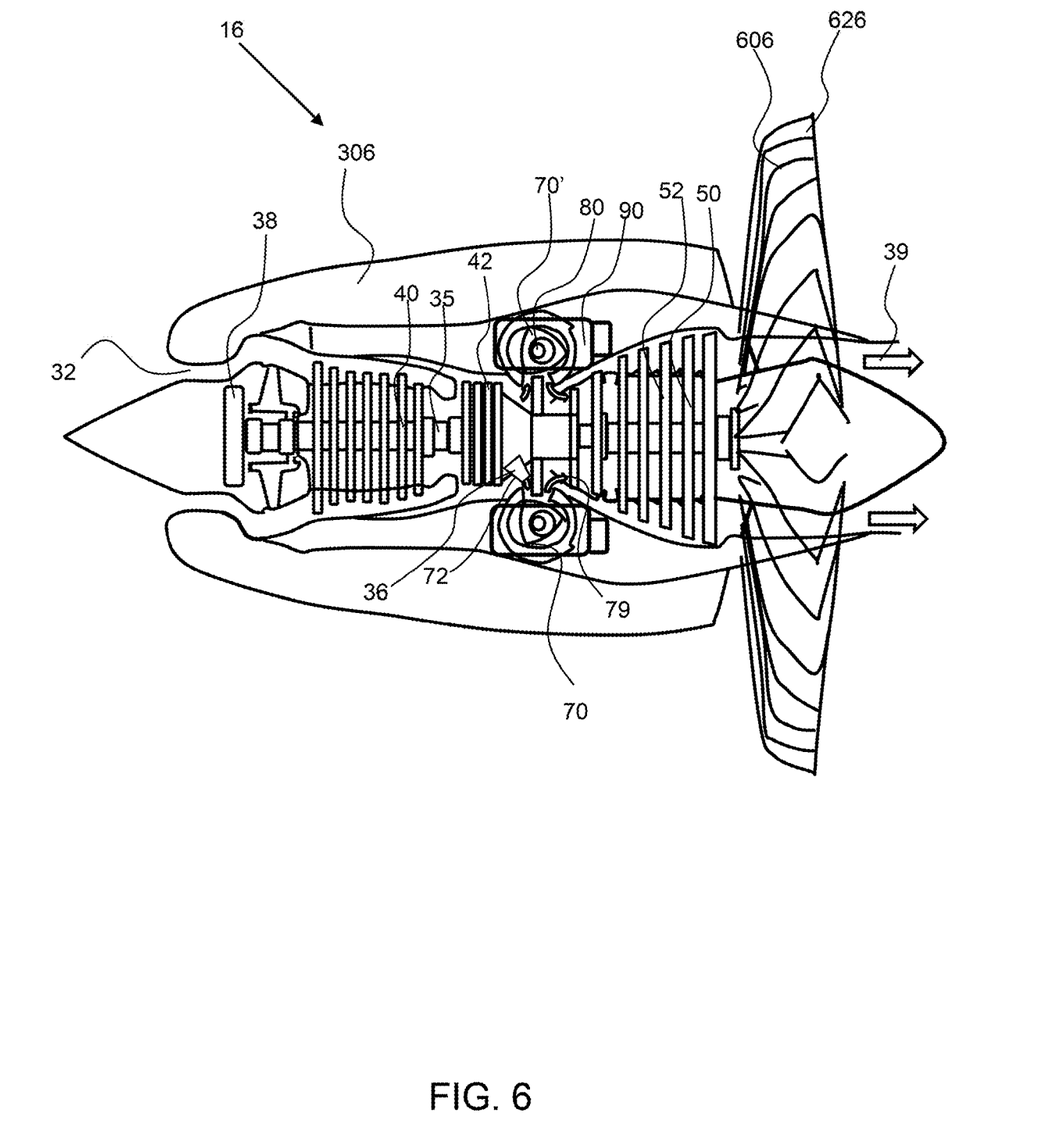
FIG. 6 shows a side cross-sectional view of an exemplary turbine engine system comprising a plurality of augmented combustion modules configured between the compressor and the turbine portions of the turbine engine and the fan located at the back of the turbine engine.

As shown in FIG. 6, an exemplary turbine engine system 16 comprises a plurality of augmented combustion modules 70, 70' configured between the compressor 40 and the turbine portion 50 of the turbine engine 306. In this embodiment, the fan 606, having fan blades 626, is located at the back of the turbine engine, or downstream of the augmented combustion modules 70, 70'. Note that a turbine engine may have any number of fans including a fan on the front and/or on the back of the turbine.

Figure 7:
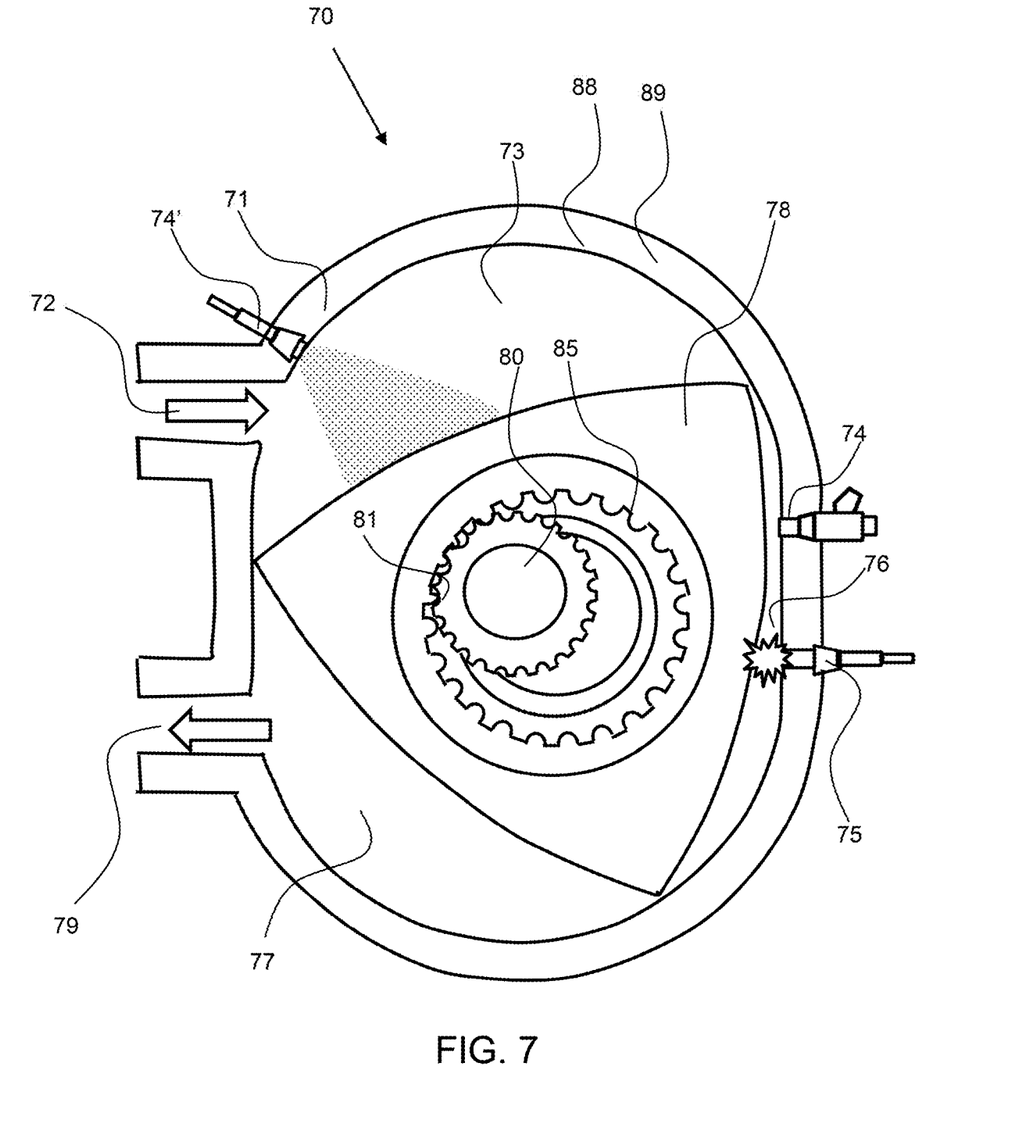
FIG. 7 shows an exemplary augmented combustion module, a Wankel engine having an eccentric shaft coupled with a rotor to form an intake chamber, a compression chamber, a combustion chamber and an exhaust chamber.

As shown in FIG. 7, an exemplary augmented combustion module 70 is a rotary engine 88, such as a Wankel engine 89 having an eccentric shaft 80 coupled with a rotor 78 to form an intake chamber 73 which may also act as a compression chamber, a combustion chamber 76 and an exhaust chamber 77. The Wankel engine has an eccentric shaft 80 that is coupled to the rotor by the pinion 81 and a crown gear 85. The rotor forms dynamic chambers within the housing 71 during rotation. The air enters the inlet 72 and flows into the intake chamber 73, where it is compressed. Some fuel may be injected by a fuel injector 74', before the final fuel injection by the fuel injector 74 and combusted by the ignitor 75 in the combustion chamber 76. The combusted fuel drives the rotor and the eccentric shaft to the exhaust chamber 77. The combusted fuel exits the engine through the outlet 79. As described herein, the exhaust flows to the turbine to drive the turbine and the main shaft connected thereto.

As shown in FIG. 7, the Wankel rotary engine has two fuel injectors, a first fuel injector 74' that introduces fuel into the intake chamber that upon rotation of the rotor becomes a compression chamber 69. A second fuel injector 74 introduces a second amount of fuel into the combustion chamber 76 before the ignitor 75 ignites the fuel. This amount of fuel injected by the first fuel injector may be effectively low to prevent combustion of this fuel before the ignitor ignites the fuel.

Figure 8:
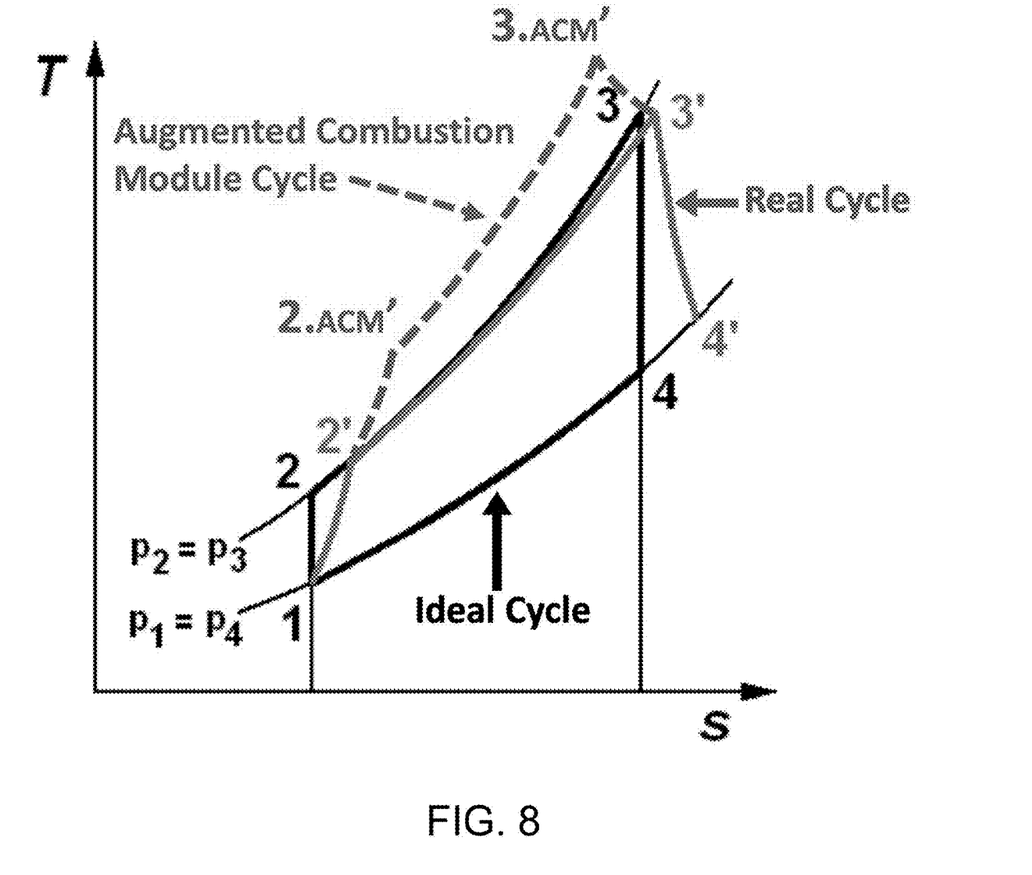
FIG. 8 shows a Temperature-Entropy (T-S) turbine cycle diagrams for an ideal conventional turbine, a real cycle of a turbine and a turbine having an augmented combustion module cycle.

FIG. 8, shows a Temperature-Entropy (T-S) turbine cycle diagram for an ideal conventional turbine, a real cycle of a turbine and a turbine having an augmented combustion module cycle. The turbine engine operates on the Brayton thermodynamic cycle. Using the turbine engine station numbering system, shown on FIG. 8, airflow free stream conditions are represented at station 1. The airflow is compressed by the compressor and in the case of an aircraft application, also by the energy associated with the aircraft velocity which increases the static pressure of the air at station 2. Ideally, the compression is isentropic and the static temperature is also increased as shown on the plot at station 2. The compressor does work on the gas and increases the pressure and temperature isentropically as represented by the ideal cycle. The real cycle shows that the compression is not ideally isentropic, resulting in a path line from station 1 to station 2' that slopes to the right because of the increase in entropy of the flow, with a higher final compression temperature as shown at station 2'. The combustion process occurs at constant pressure from station 2 to station 3 in the ideal cycle, whereas the real cycle is shown from station 2' to 3'. The temperature increase depends on the type of fuel used, the air-fuel ratio and the pressure ratio employed. The hot exhaust is then passed through the power turbine in which work is done by the flow from station 3 to station 4 in the ideal cycle, and 3' to 4' in the real cycle. The augmented combustion module performs a secondary compression process, shown by the path line extending from 2' to 2.ACM', thereby increasing the overall peak cycle pressure. The augmented combustion module will contribute a higher temperature and pressure output after combustion as shown as station 3.ACM'. The augmented combustion module extracts power through expansion from 3.ACM' to 3'. Because the turbine and compressor are coupled to the same shaft, the work produced by the turbine is minimally equal to the work done by the compressor. The flow then is isentropically returned back to ambient pressure from station 3 to station 4 in the ideal cycle, and from station 3' to station 4' in the real cycle. Externally, the flow returns to ambient conditions which completes the cycle. The area contained within the T-S diagram is proportional to the useful work generated by the engine. As shown, more useful work can be produced with the augmented combustion module cycle than a real cycle from a conventional turbine system. Those skilled in the art will see the advantages through examination of the T-S diagram.

Figure 9:
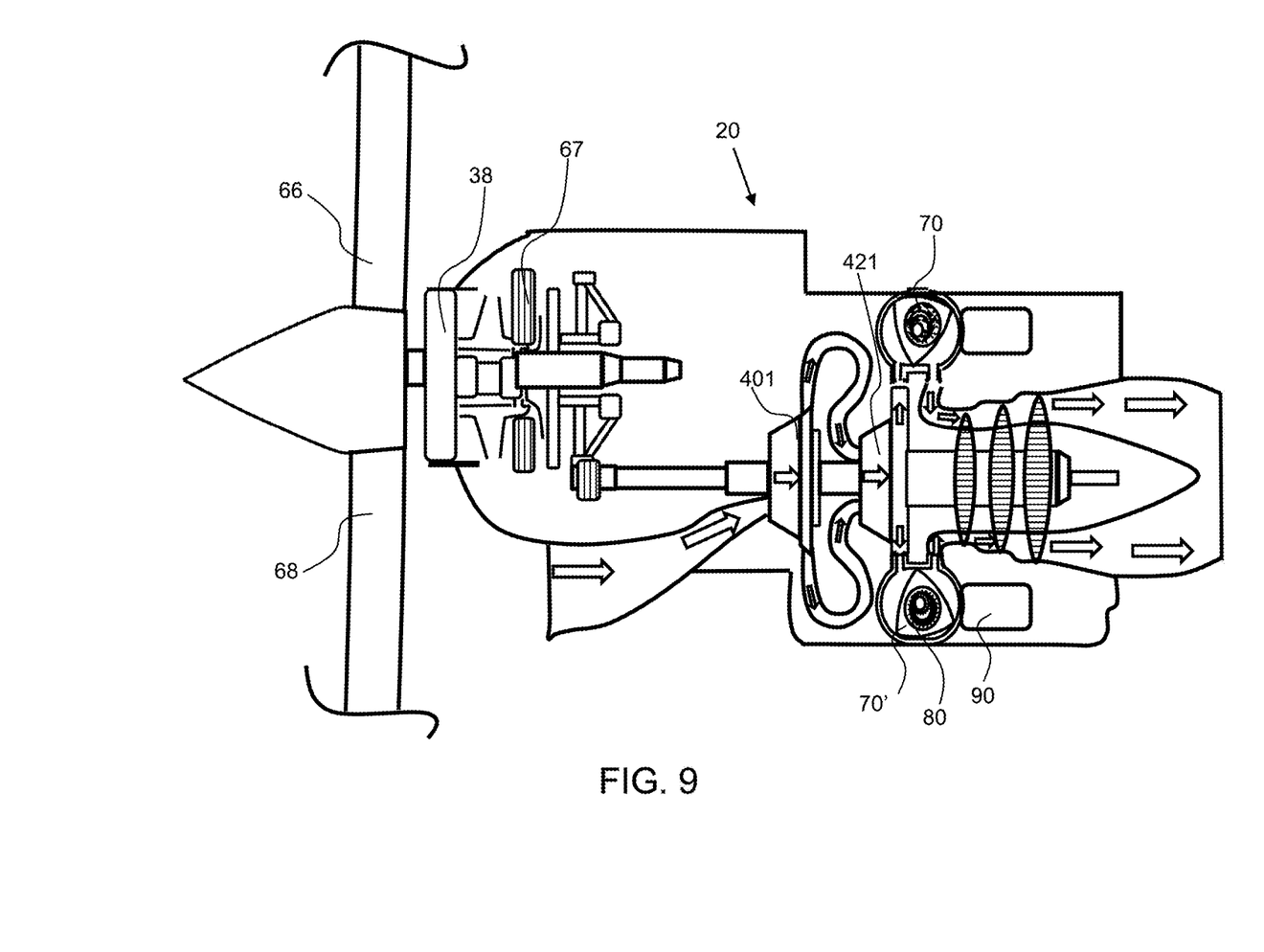
FIG. 9 shows a cross-sectional view of an exemplary turbine engine system coupled to a propeller and comprising a compressor, a plurality of augmented combustion modules and a turbine.

Referring now to FIG. 9, an exemplary turbine engine system comprises a low-pressure compressor 401, a high-pressure compressor 421 and a plurality of augmented combustion modules 70, 70' located between the compressor and the turbine 501. The compressed air enters the augmented combustion modules is combusted and exits into the turbine to produce work. As shown in FIG. 9, the turbine engine system 20 is coupled with a propeller 66 having propeller blades 68 via gears 67.

Figure 10:
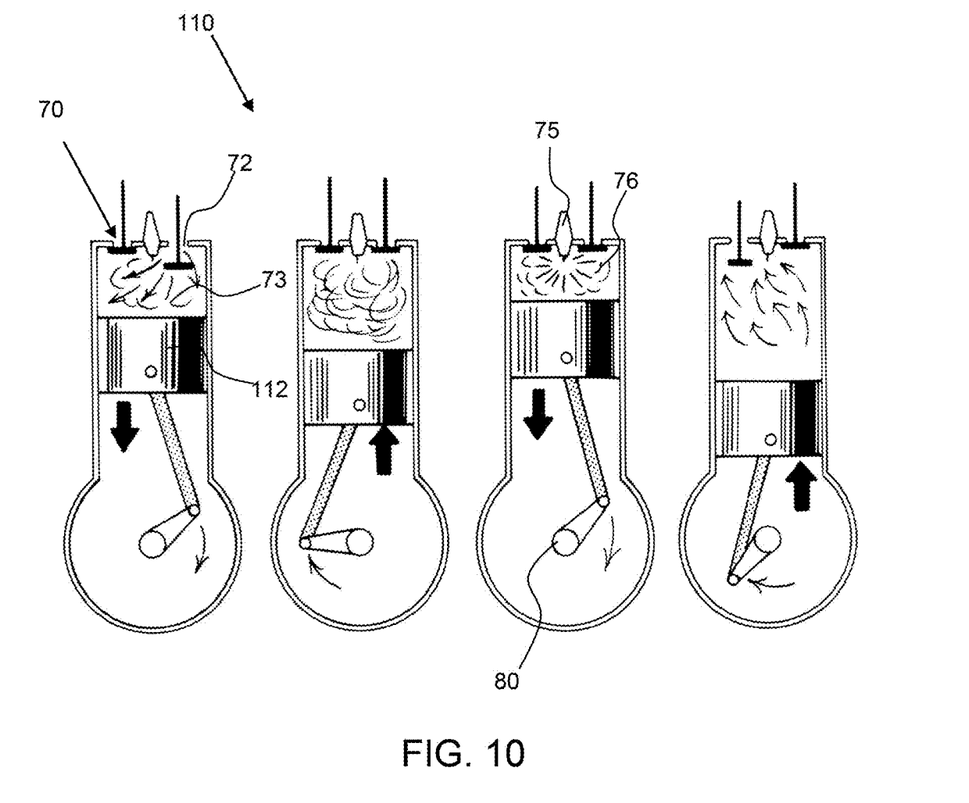
FIG. 10 shows cross-sectional diagrams of a four-stroke engine as it moves through intake, compression, power and exhaust cycles; a four-stroke engine may be utilized as an augmented combustion module.

FIG. 10 shows diagrams of a four-stroke engine 110 as it moves through intake, compression, power and exhaust cycles. A fuel mixture is drawn into the inlet chamber 73 through the inlet 72 and then compressed by the piston 112 as it moves up through the cylinder to form the compression chamber 76. The compressed fuel mixture is then ignited by an igniter 75, such as a spark plug. This forces the piston back down into the cylinder. The crankshaft 80 is driven to rotate as a result of this cycle. Note that a fuel mixture may ignite due to compression alone, such as in a diesel engine. A four-stroke engine 110 may be utilized as an augmented combustion module.

Figure 11:
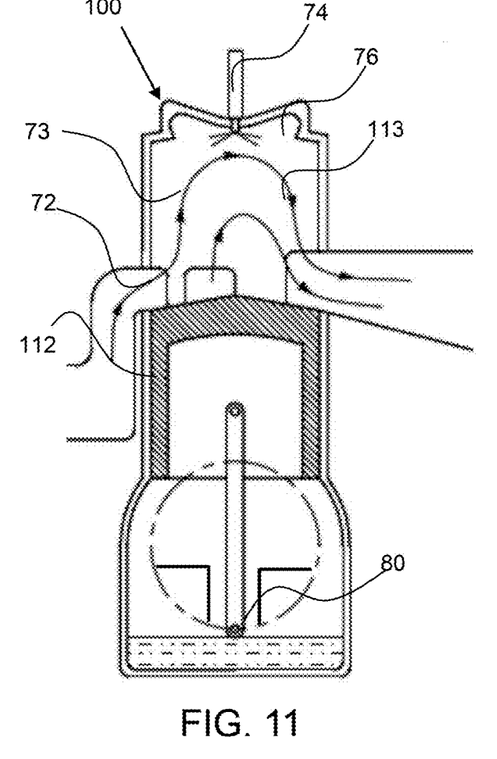
FIG. 11 shows a cross-sectional diagram of an exemplary two-stroke engine employing loop scavenging that may be utilized as an augmented combustion module.
Figure 12:
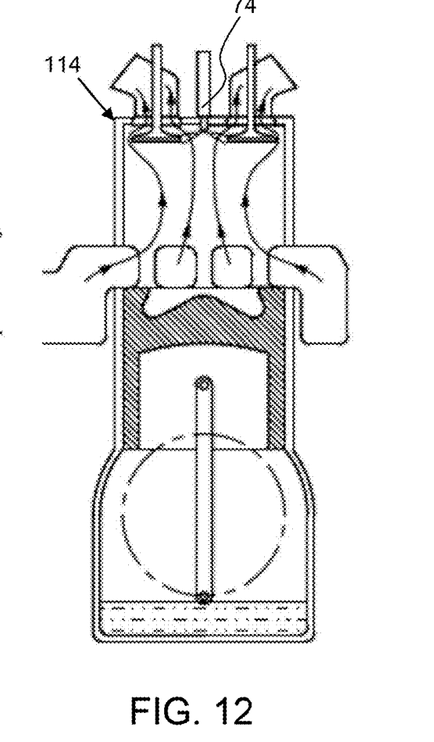
FIG. 12 shows a cross-sectional diagram of an exemplary two-stroke engine employing uniflow scavenging with valves that may be utilized as an augmented combustion module.
Figure 13:
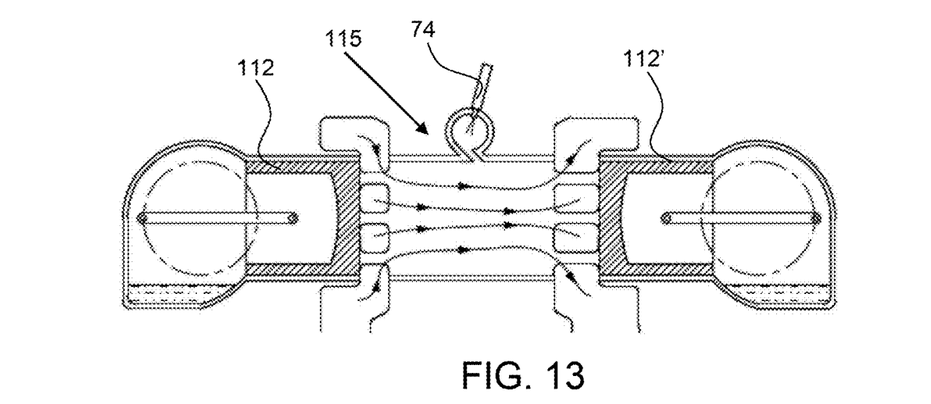
FIG. 13 shows a cross-sectional diagram of an exemplary two-stroke engine employing uniflow scavenging with two pistons per cylinder that may be utilized as an augmented combustion module.

As shown in FIGS. 11 to 13, a two-stroke engine 100 has inlet ports 72 to receive scavenge air into the intake chamber 73, said scavenge air being provided by the turbine engine compressor(s). The piston 112 then moves up to compress the intake chamber to form a combustion chamber 76. The fuel injector 74 injects the fuel, wherein it ignites by compression ignition the compressed fuel mixture to force the piston down into the cylinder. Note that a fuel mixture may ignite due to compression alone, such as in a diesel engine. The crankshaft 80 is driven to rotate as a result of this cycle. Several different embodiments of the two-stroke engine are applicable with said embodiments comprising variations in cylinder scavenging arrangements. These arrangements may comprise loop scavenging 113, as shown in FIG. 11, uniflow scavenging employing valves 114, as shown in FIG. 12, or uniflow scavenging employing two pistons per cylinder 115, as shown in FIG. 13. A two-stroke engine 100, may be utilized as an augmented combustion module having a first piston 112 and a second piston 112'. Any other embodiment of two stroke cycle engines would also be applicable for use as an augmented combustion module.

Figure 14:
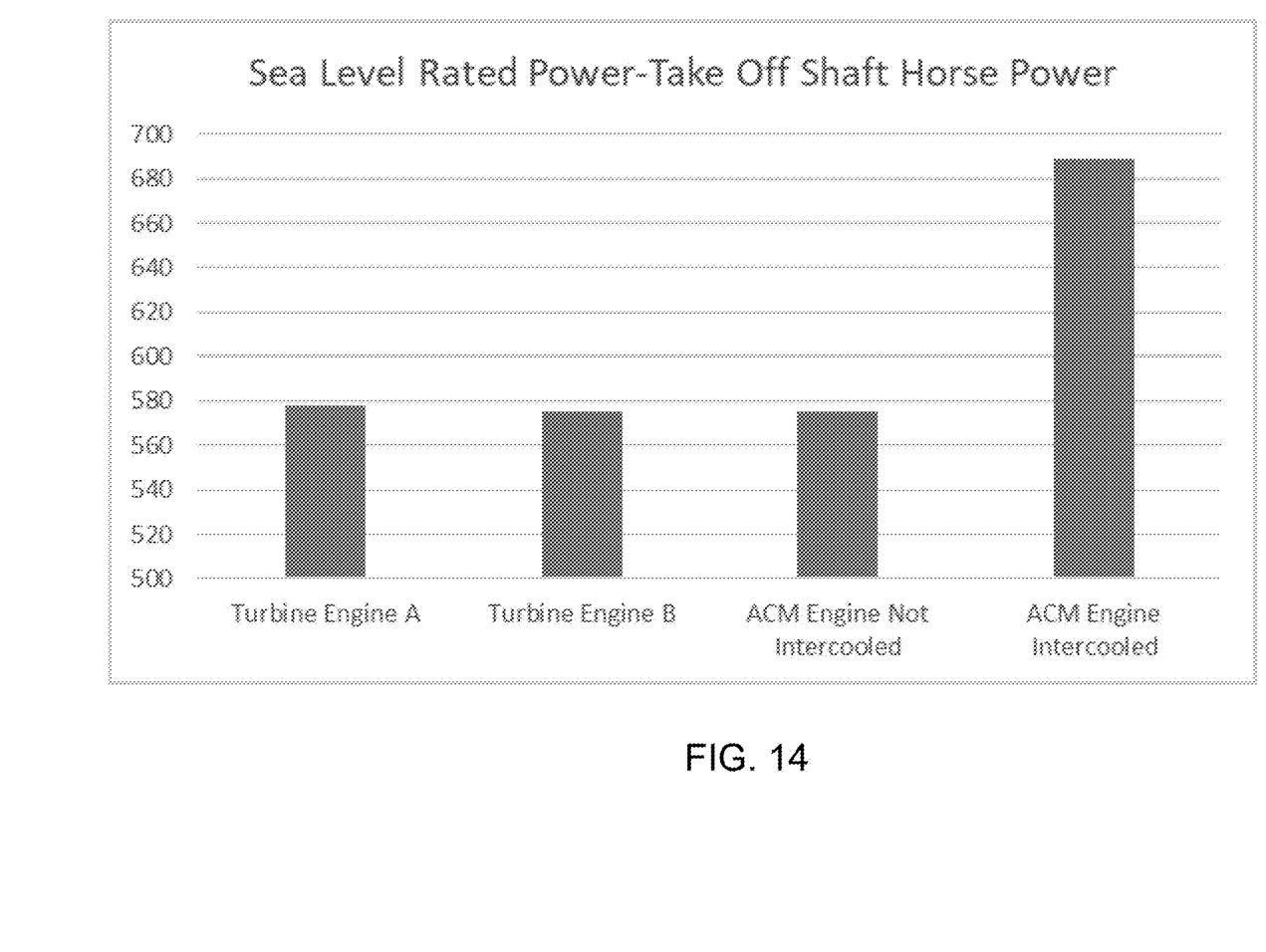
FIG. 14 shows a bar chart of sea level rated take-off main shaft power produced by conventional turbine engines, a turbine engine having augmented combustion modules, as described herein, and a turbine engine having augmented combustion modules configured with an intercooler as described herein.
Figure 15:
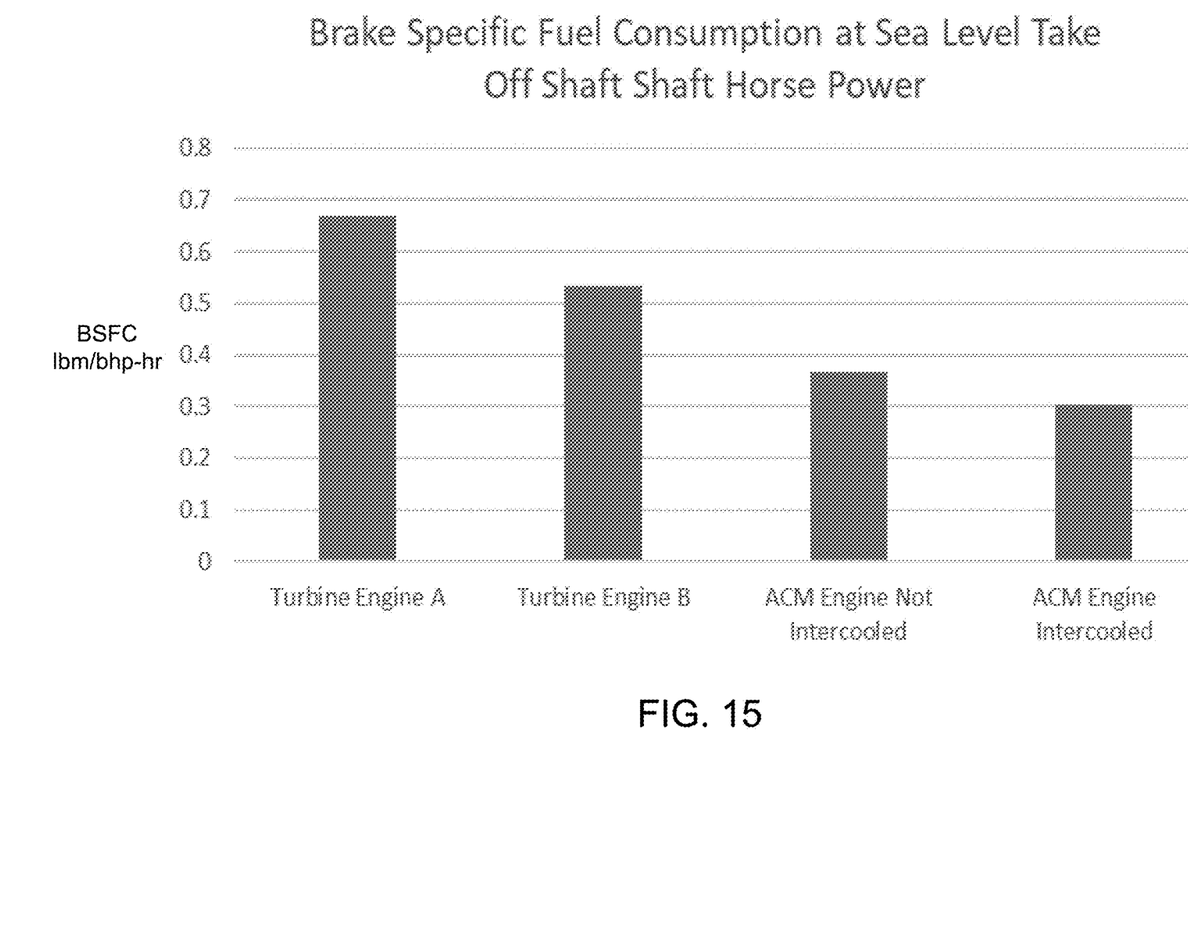
FIG. 15 shows a bar chart of brake specific fuel consumption at sea level for conventional turbine engines, a turbine engine having augmented combustion modules, as described herein, and a turbine engine having augmented combustion modules configured with an intercooler, as described herein.

Referring now to FIGS. 14 and 15, a turbine engine configured with augmented combustion modules has greatly improved performance over conventional turbine engines. FIG. 14 shows a bar chart of sea level rated take-off main shaft power produced by conventional turbine engines, a turbine engine having augmented combustion modules, as described herein, and a turbine engine having augmented combustion modules configured with an intercooler. While the turbine engine with augmented combustion modules produces about the same power as the conventional turbine engines, the turbine engine with augmented combustion modules that are intercooled produces much more power, about 20% more. Shown in FIG. 15 is a bar chart of the brake specific fuel consumption at sea level for conventional turbine engines, a turbine engine having augmented combustion modules, as described herein, and a turbine engine having augmented combustion modules configured with an intercooler. The intercooled ACM turbine engine has a 54% reduction in fuel consumption from turbine A and a 43% reduction from turbine B; while producing more power as shown in FIG. 14. The ACM turbine engine without intercooling has a 45% reduction in fuel consumption from turbine A and a 31% reduction from turbine B and produces about the same power as turbine A and B. The data used to produce this bar charts in provided in Table 1:

TABLE 1

| | Turbine Engine A | Turbine Engine B | ACM Engine Not Intercooled | ACM Engine Intercooled |
|---|---|---|---|---|
| SL Rated Power - TO, SHP | 578 | 575 | 575 | 689 |
| BSFC, lbm fuelibhp hr | 0.670 | 0.534 | 0.366 | 0.305 |
| BSAC, lbm air/bhp hr At 20,000 Ft Altitude - | 33.0 | NA* | 6.218 | 5.192 |
| Power Available. SHP | NA* | NA* | 299.5 | 361.4 |
| BSFC, lbm fuel/bhp hr | NA* | NA* | 0.349 | 0.289 |
| BSAC, lbm air/bhp hr | NA* | NA* | 5.937 | 4.920 |

*Not Available

Modeling software was developed to calculate the brake specific fuel consumption and brake specific air consumption of commercial turbine engine systems with and without augmented combustion modules. Engine A was a Pratt & Whitney PTEA-6 turboprop and engine B was a Garrett TPE331-43A turboprop. The modeling software accurately calculated the brake specific fuel consumption and brake specific air consumption with respect to factory values reported.

Figure 16:
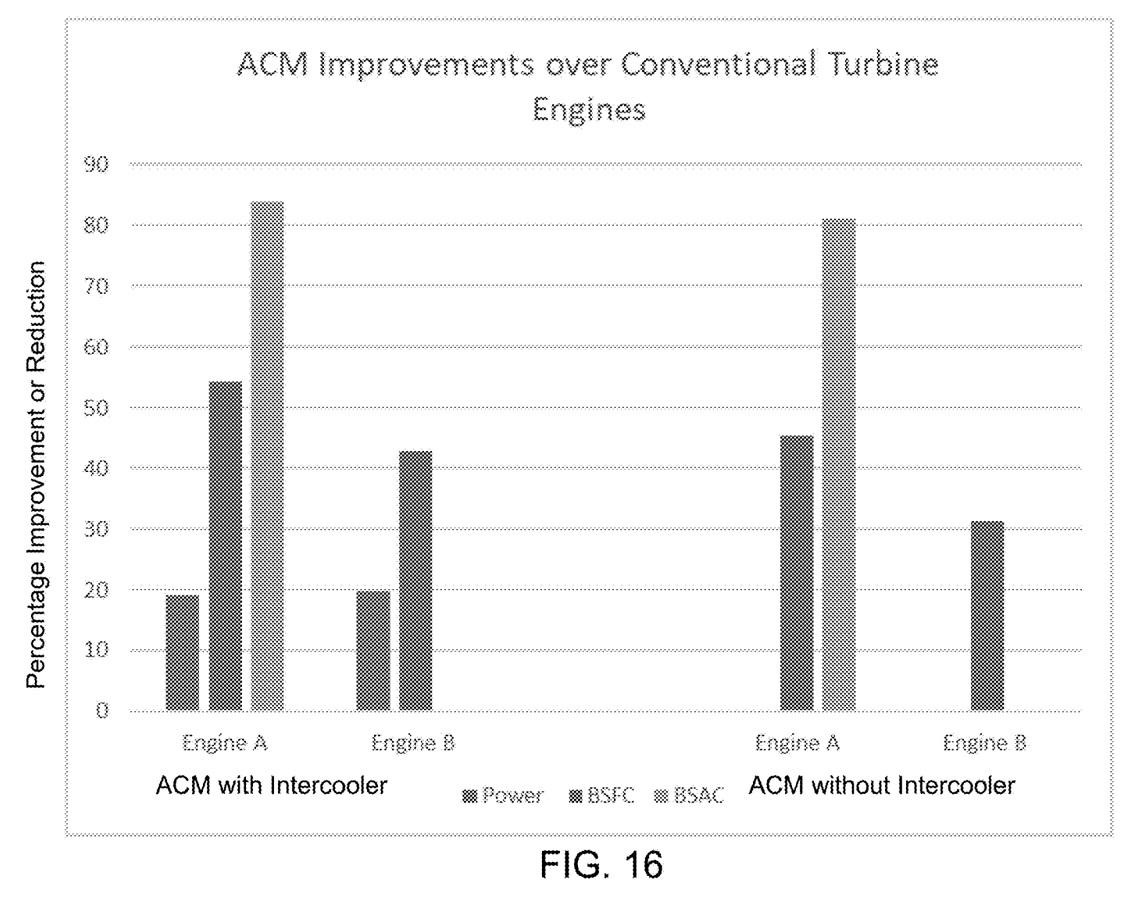
FIG. 16 shows a bar chart of the improvements in performance realized using an augmented combustion module with a turbine engine.

As shown in FIG. 16, the turbine engine with augmented combustion modules and an intercooler produced about 20% more power over Turbine Engine A and B, and had greatly improved brake specific fuel consumption (BSFC), 54% reduction over Engine A and 43% reduction over Engine B. The turbine engine with augmented combustion modules and an intercooler also had greatly improved brake specific air consumption over Engine A, with an 84% reduction. This percentage reduction in BSFC is calculated as (0.305 (BSFC of ACM)−0.670 (BSFC Engine A))/0.670 (BSFC Engine A)) for example, wherein the value is negative indicating a reduction.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of producing power from a turbine engine system comprising:
   a) providing said turbine engine system comprising
     i) a turbine engine comprising:
       an inlet fan;
       an air inlet to said inlet fan;
       a compressor;
       a main shaft mechanically coupled to the inlet fan and configured to drive the inlet fan;
       a motor mechanically coupled to the main shaft and configured to drive the main shaft;
       a turbine coupled to the main shaft and configured to drive the main shaft;
     ii) a plurality of augmented combustion modules between the compressor and the turbine along the main shaft and arrayed circumferentially around the main shaft, each of the plurality of augmented combustion modules being a rotary engine comprising:
       a rotor;
       a shaft;

one or more dynamic chambers, wherein rotation of the rotor within the housing sequentially converts each of said one or more dynamic chambers into an intake chamber, a compression chamber, a combustion chamber, and an exhaust chamber;

a housing configured around the rotor and the one or more dynamic chambers;

iii) a plurality of electrical power generators, wherein each of the plurality of augmented combustion modules is coupled with one of the plurality of electrical power generators by the respective shaft of the augmented combustion module;

b) powering the main shaft to turn the inlet fan, the inlet fan providing thrust and drawing air into the compressor to produce compressed air for the plurality of augmented combustion modules;

c) injecting fuel into the plurality of augmented combustion modules to produce a fuel mixture of said compressed air and said fuel;

d) flowing the fuel mixture in said plurality of augmented combustion modules;

e) combusting the fuel mixture within said plurality of augmented combustion modules;

wherein an exhaust from said plurality of augmented combustion modules flows through the turbine to produce thrust, or drive the main shaft, or both produce thrust and drive the main shaft;

f) producing electrical power by the plurality of electrical power generators driven by the plurality of augmented combustion modules; and g) supplying said electrical power to an auxiliary electrical device.

2. The method of claim 1, wherein the turbine engine is coupled with an aircraft and wherein the auxiliary electrical device is configured within the aircraft.

3. The method of claim 1, wherein the plurality of augmented combustion modules includes three or more augmented combustion modules.

4. The method of claim 1, wherein each of the plurality of augmented combustion modules outputs torque that drives the respective shaft of the augmented combustion module, and wherein said respective shaft of each of the plurality of augmented combustion modules is mechanically coupled with the main shaft to drive the main shaft.

5. The method of claim 1, wherein the turbine engine system is coupled with an aircraft.

6. The method of claim 1, wherein the turbine engine system is coupled with a vehicle and wherein the auxiliary electrical device is configured within the vehicle.

7. The method of claim 1, wherein each of the plurality of augmented combustion modules further comprises an induction air intercooler to maintain the augmented combustion module below a temperature limit.

8. The method of claim 1, wherein each of the plurality of augmented combustion modules is a Wankel engine.

9. The method of claim 8, wherein each of the Wankel engines comprises said respective one or more dynamic chambers and a fuel injector, and when said one or more dynamic chambers is the intake chamber, the fuel injector is configured to inject the fuel into said intake chamber.

10. The method of claim 1, wherein each of the plurality of augmented combustion modules further comprises a fuel injector to inject said fuel such that the fuel mixture of said compressed air and said fuel has a stoichiometric mixture ratio.

11. The method of claim 10, wherein the fuel is diesel fuel and wherein the stoichiometric mixture ratio is substantially 14.5:1.

12. The method of claim 10, wherein the fuel is gasoline fuel and wherein the stoichiometric mixture ratio is substantially 15:1.

13. The method of claim 10, wherein the fuel comprises liquid JP type-kerosene turbine fuels and wherein the stoichiometric mixture ratio is substantially 14.5:1.

14. The method of claim 10, wherein the fuel comprises gaseous fuel.

15. The method of claim 14, wherein the gaseous fuel comprises hydrogen.

16. The method of claim 14, wherein the fuel is hydrogen and wherein the stoichiometric mixture ratio is substantially 34.5:1.

17. The method of claim 14, wherein the gaseous fuel comprises methane.

18. The method of claim 14, wherein the fuel is methane and wherein the stoichiometric mixture ratio is substantially 10.4:1.

* * * * *